United States Patent [19]

Iwasaki et al.

[11] Patent Number: 4,992,781
[45] Date of Patent: Feb. 12, 1991

[54] IMAGE SYNTHESIZER

[75] Inventors: Keisuke Iwasaki, Nara; Masaki Takakura, Osaka; Yasukuni Yamane, Nara; Noritoshi Kako, Nara, all of Japan

[73] Assignee: Sharp Kabushiki Kaisha, Osaka, Japan

[21] Appl. No.: 219,287

[22] Filed: Jul. 14, 1988

[30] Foreign Application Priority Data

Jul. 17, 1987 [JP] Japan .................... 62-179657
Aug. 4, 1987 [JP] Japan .................... 62-195669

[51] Int. Cl.$^5$ ............................ G09G 1/14
[52] U.S. Cl. ............................ 340/747; 340/721; 340/723; 358/22; 358/183
[58] Field of Search ............ 340/747, 750, 799, 728, 340/723, 721; 358/183, 182, 22

[56] References Cited

U.S. PATENT DOCUMENTS

| | | | |
|---|---|---|---|
| 4,298,931 | 11/1981 | Tachinuhi et al. | 340/799 |
| 4,308,532 | 12/1981 | Murphy | 340/750 |
| 4,528,561 | 7/1985 | Kitamura | 340/745 |
| 4,531,120 | 7/1985 | Brownell | 340/723 |
| 4,602,286 | 7/1986 | Kellar et al. | 358/183 |
| 4,686,521 | 8/1987 | Beaver et al. | 340/747 |

Primary Examiner—Alvin E. Oberley
Assistant Examiner—Xiao Min Wu
Attorney, Agent, or Firm—Flehr, Hohbach, Test, Albritton & Herbert

[57] ABSTRACT

An image synthesizer of an image editing apparatus not only stores image data of two or more source images and includes a display device for displaying an image according to received image data, but also is provided with an address generator which, controlled by a data processor, transmits address signals sequentially to have a synthesized image of these source images displayed such that the individual source images appear superposed and transparent to each other. Each pixel of the display device displays only one of the source images and area densities of pixels displaying each of the source images very over the two-dimensional screen of the display device. When one of the source images is superposed on top of another, a pattern is stored in a pattern memory such that pixels displaying one of the images are scattered into the area of the other image according to the pattern such that the boundary between source images can be made controllably less conspicuous.

1 Claim, 12 Drawing Sheets

| 0 | 1 | 0 | 0 | 1 | 0 | 1 | 0 |
|---|---|---|---|---|---|---|---|
| 1 | 0 | 0 | 1 | 0 | 0 | 0 | 1 |
| 0 | 0 | 1 | 0 | 1 | 1 | 0 | 0 |
| 1 | 0 | 1 | 1 | 1 | 0 | 1 | 0 |
| 0 | 1 | 0 | 1 | 1 | 1 | 0 | 1 |
| 0 | 0 | 1 | 1 | 0 | 1 | 0 | 0 |
| 1 | 0 | 0 | 0 | 1 | 0 | 0 | 1 |
| 0 | 1 | 0 | 1 | 0 | 0 | 1 | 0 |

FIG._18C

| 0 | 0 | 0 | 0 | 0 | 0 | 0 | 0 |
|---|---|---|---|---|---|---|---|
| 0 | 0 | 0 | 1 | 0 | 0 | 0 | 0 |
| 0 | 0 | 0 | 0 | 1 | 0 | 0 | 0 |
| 0 | 0 | 1 | 1 | 0 | 1 | 0 |   |
| 0 | 1 | 0 | 1 | 1 | 1 | 0 | 0 |
| 0 | 0 | 0 | 1 | 0 | 0 | 0 | 0 |
| 0 | 0 | 0 | 0 | 1 | 0 | 0 | 0 |
| 0 | 0 | 0 | 0 | 0 | 0 | 0 | 0 |

| 9 | 9 | 6 | 7 | 6 | 9 | 9 | 9 | 9 | 3 | 4 | 5 |
|---|---|---|---|---|---|---|---|---|---|---|---|
| 9 | 9 | 5 | 6 | 5 | 9 | 9 | 9 | 9 | 3 | 4 | 4 |
| 9 | 9 | 9 | 5 | 6 | 5 | 9 | 9 | 9 | 9 | 3 | 3 |
| 9 | 9 | 9 | 5 | 5 | 5 | 4 | 9 | 9 | 9 | 2 | 2 |
| 9 | 9 | 9 | 9 | 4 | 5 | 4 | 3 | 3 | 9 | 2 | 2 |
| 9 | 9 | 9 | 9 | 9 | 3 | 4 | 3 | 2 | 3 | 3 | 3 |
| 9 | 9 | 9 | 9 | 9 | 9 | 3 | 2 | 2 | 2 | 3 | 2 |
| 9 | 9 | 9 | 9 | 9 | 9 | 9 | 9 | 1 | 1 | 2 | 2 |
| 9 | 9 | 9 | 9 | 9 | 9 | 9 | 9 | 9 | 9 | 9 | 2 |
| 9 | 9 | 9 | 9 | 9 | 9 | 9 | 9 | 9 | 9 | 9 | 1 |
| 9 | 9 | 9 | 9 | 9 | 9 | 9 | 9 | 9 | 9 | 9 | 9 |
| 9 | 9 | 9 | 9 | 9 | 9 | 9 | 9 | 9 | 9 | 9 | 9 |

*FIG._23A*

| 6 | 6 | 6 | 7 | 6 | 6 | 6 | 3 | 3 | 3 | 4 | 5 |
|---|---|---|---|---|---|---|---|---|---|---|---|
| 5 | 5 | 5 | 6 | 5 | 5 | 5 | 3 | 3 | 3 | 4 | 4 |
| 5 | 5 | 5 | 5 | 6 | 5 | 5 | 4 | 3 | 3 | 3 | 3 |
| 5 | 5 | 5 | 5 | 5 | 5 | 4 | 4 | 3 | 2 | 2 | 2 |
| 5 | 5 | 5 | 5 | 4 | 5 | 4 | 3 | 3 | 3 | 2 | 2 |
| 5 | 5 | 5 | 4 | 4 | 3 | 4 | 3 | 2 | 3 | 3 | 3 |
| 5 | 5 | 4 | 4 | 3 | 3 | 2 | 2 | 2 | 3 | 2 |
| 5 | 4 | 4 | 3 | 3 | 3 | 3 | 2 | 1 | 1 | 2 | 2 |
| 4 | 4 | 3 | 3 | 3 | 3 | 3 | 1 | 1 | 1 | 2 | 2 |
| 4 | 3 | 3 | 3 | 3 | 3 | 1 | 1 | 1 | 1 | 1 | 1 |
| 3 | 3 | 3 | 3 | 3 | 1 | 1 | 1 | 1 | 1 | 1 | 1 |
| 3 | 3 | 3 | 3 | 1 | 1 | 1 | 1 | 1 | 1 | 1 | 1 |

*FIG._23B*

IMAGE SYNTHESIZER

BACKGROUND OF THE INVENTION

This invention relates to an image synthesizer and more particularly to an image synthesizer of an image editing apparatus for editing, creating and displaying a new pictorial image by processing two or more sets of image data.

When an image editor of this type is used to synthesize a new image from two or more original source images, the conventional procedure has been to operate its keyboard, while watching the superposedmutually transparent display of these source images, to adjust the two-dimensional positional relationships among them. In connection with such a procedure, one method of superposingly synthesizing two mutually transparent images A and B, for example, is to read out pixel values of these images A and B respectively stored in different image memories $M_a$ and $M_b$ by means of a data processor to calculate their average values and to display such average values calculated individually for each pixel. Another method is to read out pixel values, for example, of the image A stored in a display memory $M_v$ and those of the image B stored in an image memory $M_b$ by a data processor to calculate their average values and to display such average values after rewriting the display memory $M_v$ by these calculated average values.

With either of these exemplary methods, data processing becomes extremely time-consuming because averages of two or more sets of image data must be calculated for all pixels in the superposed area. In the case of a composite image requiring no transparency in superposition, the averaging process is carried out only for pixels in boundary areas between different images to make the boundary lines less conspicuous but the amount of calculations to be carried out is still significantly large. By the second of the two methods described above, furthermore, there is the disadvantage of losing one of the source images because its image data stored in the display memory is replaced by the newly calculated average values. In order to make this image restorable, its data must be temporarily saved and this means that an increased memory capacity is required.

SUMMARY OF THE INVENTION

It is therefore an object of the present invention to provide an image synthesizer for an image editing apparatus with which a synthesized image can be quickly displayed by superposing two or more source images one on top of another such that they are all visible, being transparent to each other.

It is another object of the present invention to provide an image synthesizer for an image editing apparatus with which a synthesized image can be quickly displayed by superposing one of the source images on top of another such that their boundary lines appear inconspicuous.

In view of the above and other objects, an image synthesizer embodying the present invention is characterized not only as having memory means for storing image data of two or more source images and a display device for displaying a pictorial image according to image data received thereby but also as having an address generator which generates address signals and transmits them sequentially to the memory means to cause image data therein to be transmitted to the display device for a display. A data processor for controlling the operations of all these components also controls the sequence in which these address signals should be transmitted such that each pixel on the display device displays a specified one of the source images and that area densities of pixels displaying each of the source images vary over the two-dimensional screen of a display device. This makes it possible to display a synthesized image of two or more source images which are mutually superposed and transparent to each other. What is hereinafter referred to as a pattern memory may additionally be provided to store data on a pattern according to which, when one of the source images is superposed on top of another to form a composite image, the boundary between the two can be made controllably less conspicuous.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DETAILED DESCRIPTION OF THE INVENTION

In what follows, the present invention is described by way of examples. In all these examples, the principles of the present invention are explained for a situation where only two source images are synthesized but this is not intended to limit the scope of the invention. Extension to situations of syntheses of three or more source images should be readily understandable from the disclosure below.

Figure 1:
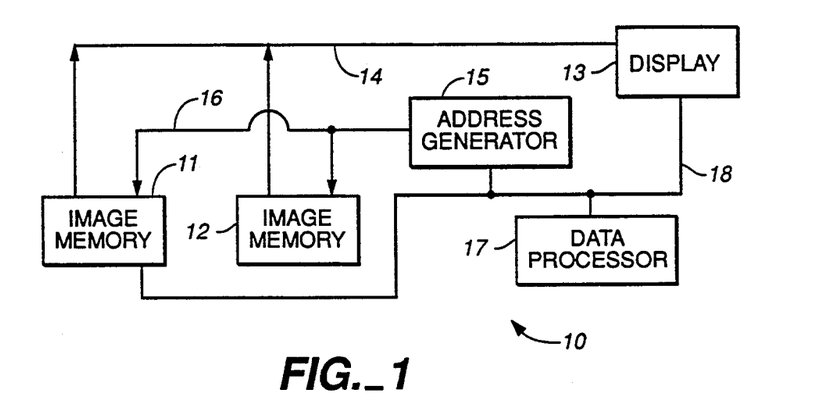
FIG. 1 is a block diagram of an image synthesizer embodying the present invention.

As shown by way of a block diagram in FIG. 1, an image synthesizer 10 according to one embodiment of the present invention is comprised of image memories 11 and 12, a display device 13 and an address generator 15. Each of the image memories 11 and 12 includes a semiconductor memory device and peripheral circuits and stores a source image to be synthesized at addresses corresponding to the two-dimensional coordinates thereon. The display device 13 is of a known type for displaying a pictorial image on its screen corresponding to image data outputted through a data bus 14 from the image memories 11 and 12. The address generator 15 is a device which generates and transmits an address signal through an address bus 16 to the image memories 11 and 12 to specify image data to be outputted therefrom. The image memories 11 and 12, the display device 13 and the address generator 15 are all connected to and controlled by a data processor 17 through a bus 18.

Figure 2A:
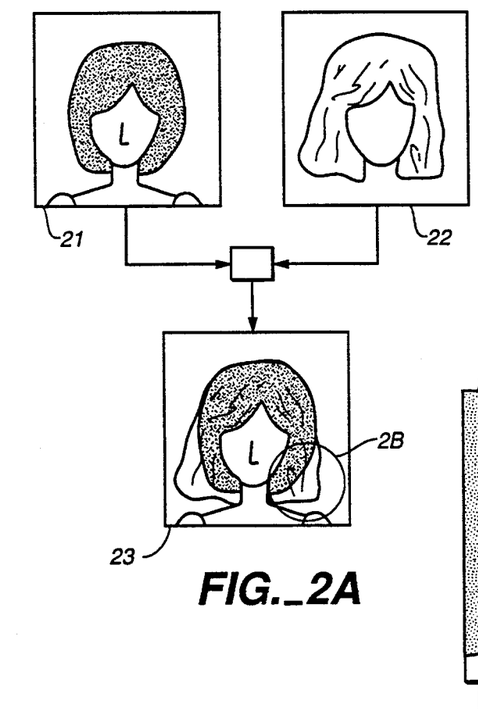
FIGS. 2A and 2B are an example of source images and a superposingly synthesized image obtained therefrom by the image synthesizer of FIG. 1, FIGS. 3A and 3B are schematic drawings showing data arrangements in the memory devices and a timing chart of processing by the image synthesizer of FIG. 1.
Figure 2B:
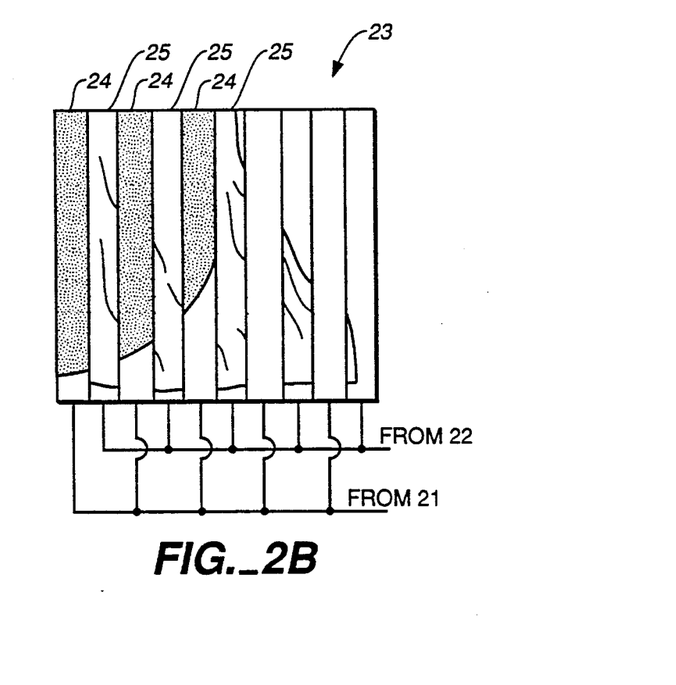

Let us assume that image data for original source images 21 and 22 shown in FIG. 2A are stored respectively in the image memories 11 and 12 and that it is desired to superpose them and to display their mutually transparent image 23 on the display device 13. As shown in FIG. 2B, the superposingly synthesized mutually transparent image 23 consists of vertically elongated thin picture elements 24 and 25 respectively of the original source images 21 and 22 each of one pixel in width alternately arranged in horizontal direction at the areal ratio of 1:1 such that the two original source images 21 and 22 appear as if they were placed one on top of the other. A method of generating this superposingly synthesized mutually transparent image 23 is described next with reference to FIGS. 3A and 3B.

Figure 3A:
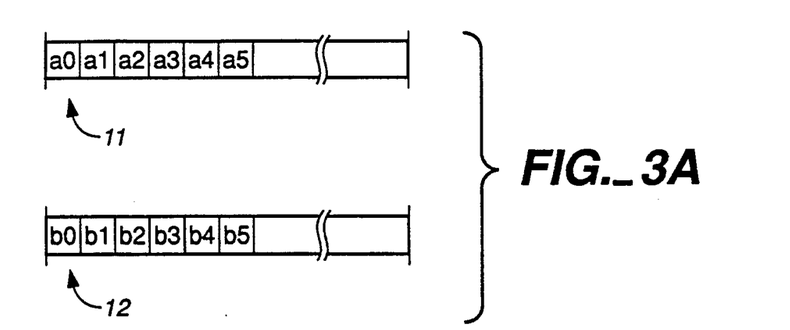
Figure 3B:
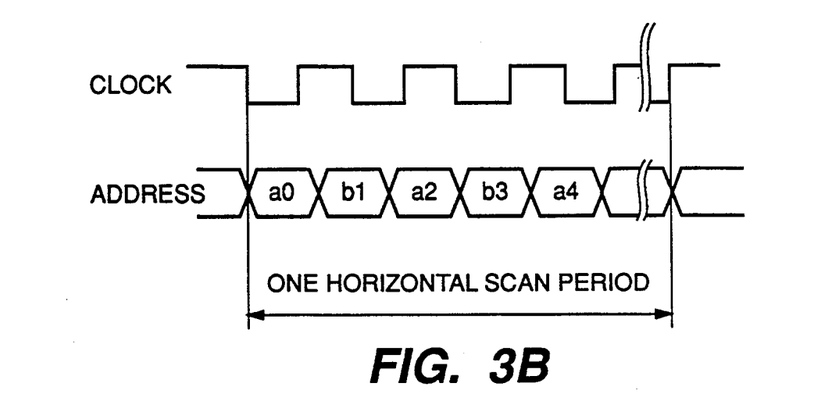

To start, the address generator 15 generates addresses of pixels in the image memories 11 and 12 sequentially and alternately within one horizontal display scan period. If the image memories 11 and 12 store image data a0, a1, a2, a3,... of the image 21 and image data b0, b1, b2, b3,... of the image 22, respectively, as shown in FIG. 3A, the address generator 15 generates addresses in the image memories 11 and 12 where image data a0, b1, a2, b3... are generated as shown in FIG. 3B and they are transmitted as address signal to the image means 11 and 12 through the address bus 16. The aforementioned data processor 17 retrieves image data a0, b1, a2, b3,... for the image memories 11 and 12 sequentially according to this address signal and transports them through the data bus 14 to the display device 13. These data are sequentially displayed at the individual pixels arranged on one horizontal line on the screen of the display device 13. With this processing repeated along each horizontal scan line, the superposingly synthesized mutually transparent image 23 of FIGS. 2A and 2B is displayed. In summary, image data from the two image memories 11 and 12 are not averaged with respect to each pixel in the superposed area. Instead, image data are alternately read from the image memories 11 and 12 according to address signal from the address generator 15 and they are directly displayed on the display device 13. As a consequence, time required for data processing can be significantly reduced.

Figure 4:
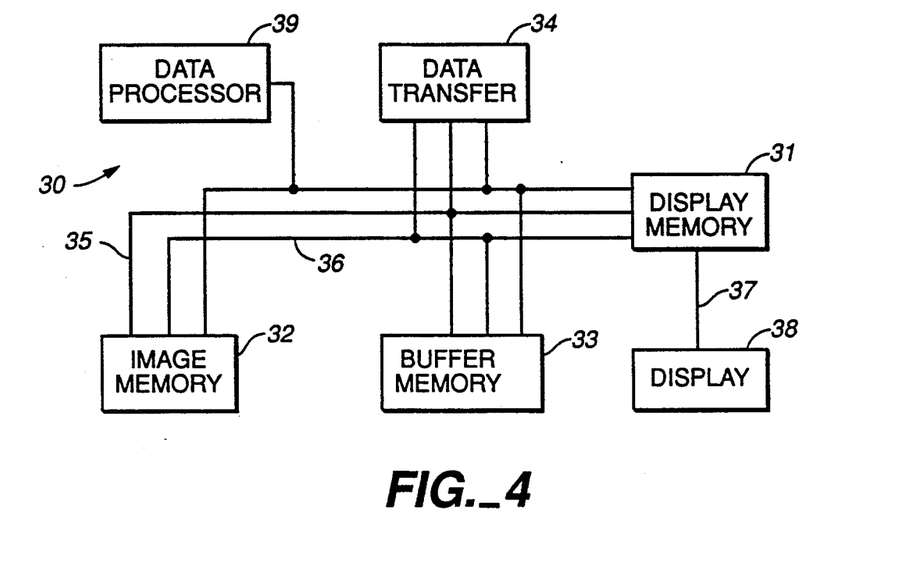
FIG. 4 is a block diagram of another image synthesizer embodying the present invention.

FIG. 4 shows another image synthesizer 30 embodying the present invention characterized as storing the image data of the source image 21 of FIG. 2A in a display memory 31 and those of the other source image 22 of FIG. 2A in an image memory 32. This image synthesizer 30 is further comprised of a buffer memory 33 for temporarily storing a part of the image data stored in the display memory 31 and a data transferring device 34 including an address generator which functions as explained above. Under the control of a data processor 39, address signal generated by the address generator of the data transferring device 34 is received by the memories 31, 32 and 33 through an address bus 35 and image data are transferred among the memories 31, 32 and 33 through a data bus 36 according to this address signal. The image data thereby stored in the display memory 31 are transmitted through a display bus 37 to be displayed by a display device 38 as a synthesized image.

Figure 5:
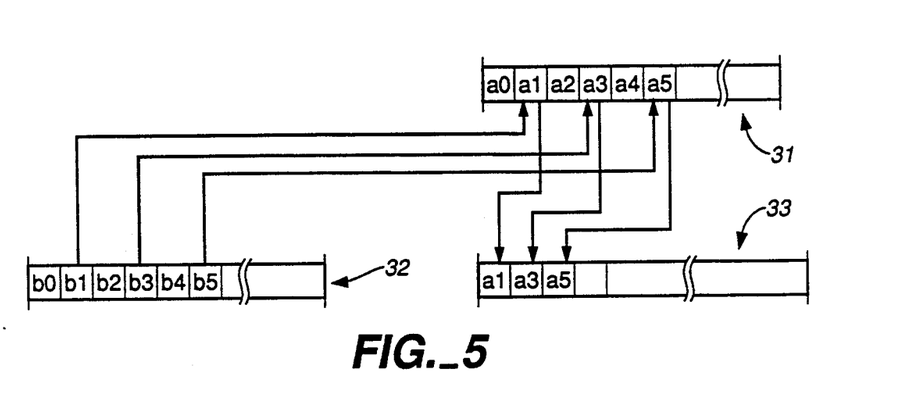
FIG. 5 is a drawing showing data arrangement in the memory devices of the image synthesizer of FIG. 4, FIGS. 6A and 6B are an example of source images and a superposingly synthesized image obtained therefrom by the image synthesizer of FIG. 4, FIGS. 7A and 7B are drawings showing data arrangements and a timing chart.

Let us consider an exemplary horizontal scan line on the images 21 and 22 of FIG. 2A. At this moment, image data a0, a1, a2, a3,... of the source image 21 and b0, b1, b2, b3,... of the other source image 22 are sequentially stored in the display memory 31 and the image memory 32 respectively as shown in FIG. 5. Then, the data transferring device 34 causes the image data in the image memory 32 to be transferred to the display memory 31 for every other pixel and the image data stored at the address at the display memory 31 where these transferred data are written are transferred to the buffer memory 33 to be temporarily stored therein. Regarding this horizontal scan line considered above, therefore, every other data b1, b3, b5,... are transferred from the image memory 32 to the corresponding addresses of the display memory 31 and the data a1, a3, a5,... originally at these addresses of the display memory 31 are sequentially transferred to and saved in the buffer memory 33 as shown in FIG. 5. This procedure is repeated for all other horizontal scan lines. Thus, image data a1, b1, a2, b3,... for one frame stored in the display memory 31 are outputted to the display device 38 through the display bus 37 and displayed on the screen of the display device 38 as a superposed mutually transparent image 23 shown in FIG. 2.

When it is desired next to return from the superposed image 23 to the original image 21, the data transferring device 34 sequentially reads out the image data a1, a3, a5,... and replaces every other data b1, b3, b5,... in the display memory 31 thereby. The contents of the display memory 31 are thus returned to the original image data a0, a1, a2, a3... of the source image 21. In summary, there is no averaging to be performed between the two image data and the time for data processing can be reduced also by this example. Another advantage of this example is that the capacity of the buffer memory can be reduced because only those of the image data in the display memory that are written over by image data from the image memory are transferred to the buffer memory 33 to be saved therein.

Figure 6A:
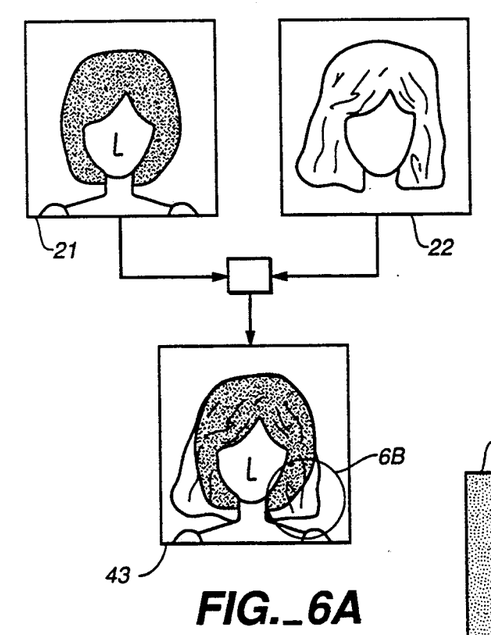
Figure 6B:
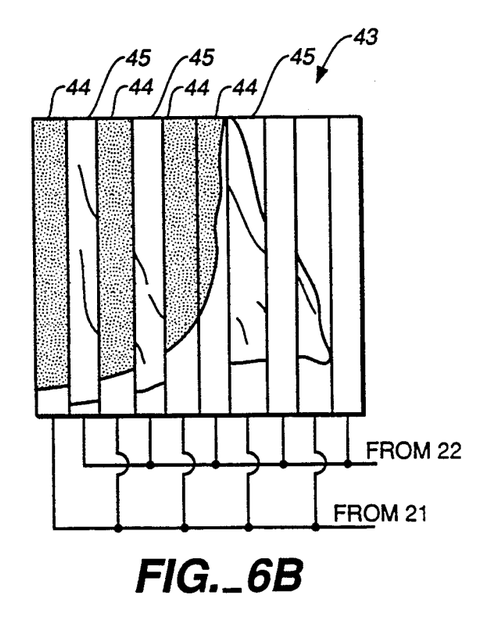

FIGS. 6A and 6B show another example of using an image synthesizer structured as shown in FIG. 1 to produce a superposingly synthesized mutually transparent image of two original source images 21 and 22. Unlike the example shown in FIGS. 2A and 2B, these two source images are synthesized at the areal ratio of 3:2 such that the first source image 21 comes out more strongly. This is apparent by a comparison, for example, between the synthesized pictures shown in FIG. 2A at 23 and in FIG. 6A at 43. The different is more clearly shown in FIG. 6B wherein 5 vertically elongated picture elements 44 and 45 respectively from the original source images 21 and 22 and both of the width of one pixel are arranged horizontally and adjacent to each other at the ratio of 3:0 to form a unit and such units are horizontally arranged one next to another.

Figures 7A, 7B:
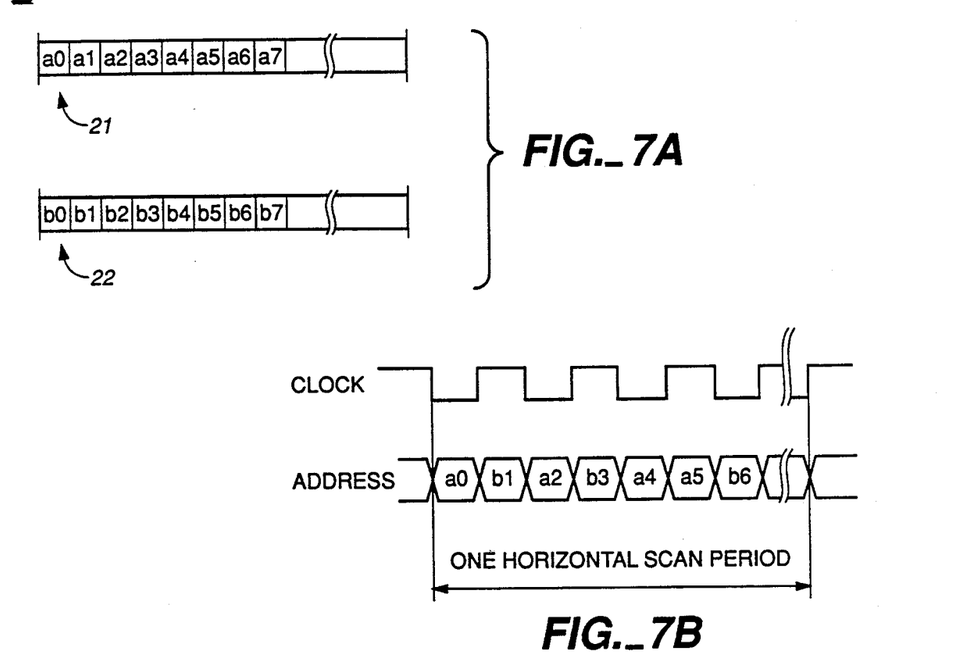

To form the synthesized image 43 of FIG. 6A and 6B, the address generator 15 generates within one horizontal scan period addresses of the image memories 11 and 12 at the ratio of 3:2. If the image data a0, a1, a2, a3,... of the image 21 and b0, b1, b2, b3,... of the image 22 on this scan line are stored respectively in the image memories 11 and 12 as shown in FIG. 7A, the address generator 15 generates sequentially the addresses of the image data a0, b1, a2, b3, a4; a5, b6,..., the semicolon indicating a boundary between two of the aforementioned units of five elements such that the desired ratio of 3:2 can be achieved. Thereafter, this series of image data is displayed at pixels on one horizontal line on the screen of the display device 13 in connection with FIG. 1. It now goes without saying that this example also has the advantage of reduced processing time because there is no averaging of data involved and that original source images can also be superposed at different ratios other than 3:2 merely by adjusting the address generator. The procedure shown above by way of FIGS. 7A and 7B can be achieved also by an image synthesizer structured as shown in FIG. 4 and three or more original source images can be synthesized similarly.

Figure 8:
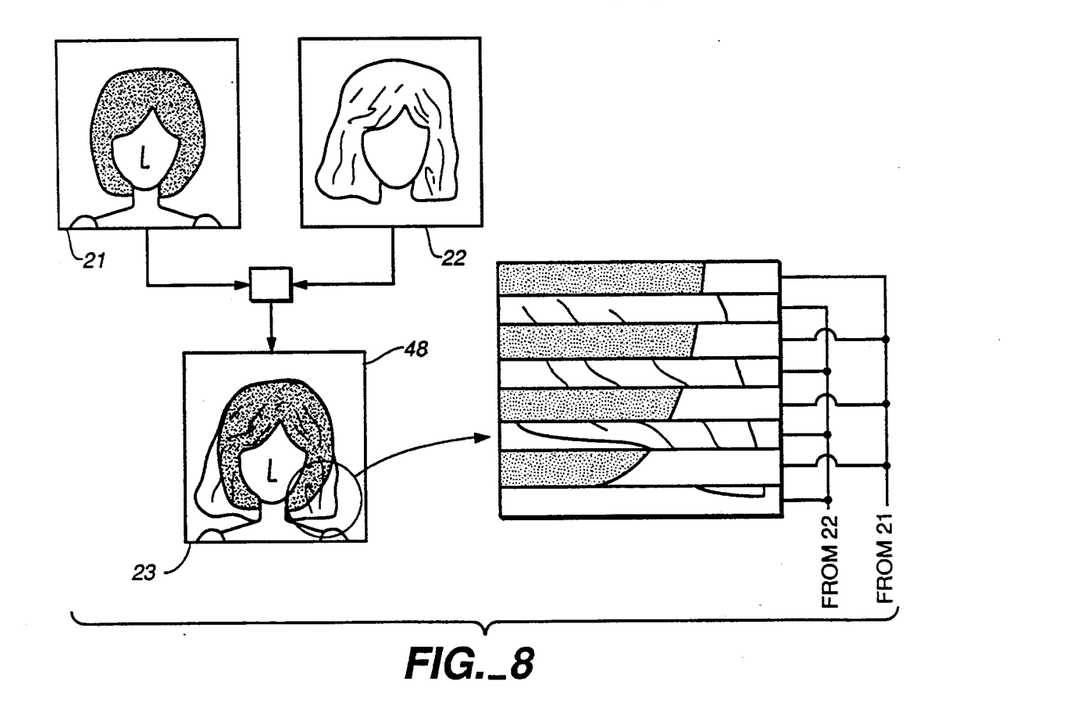
FIG. 8 is another example of source images and a superposingly synthesized image obtained therefrom by the image synthesizer of FIG. 1.
Figure 9:
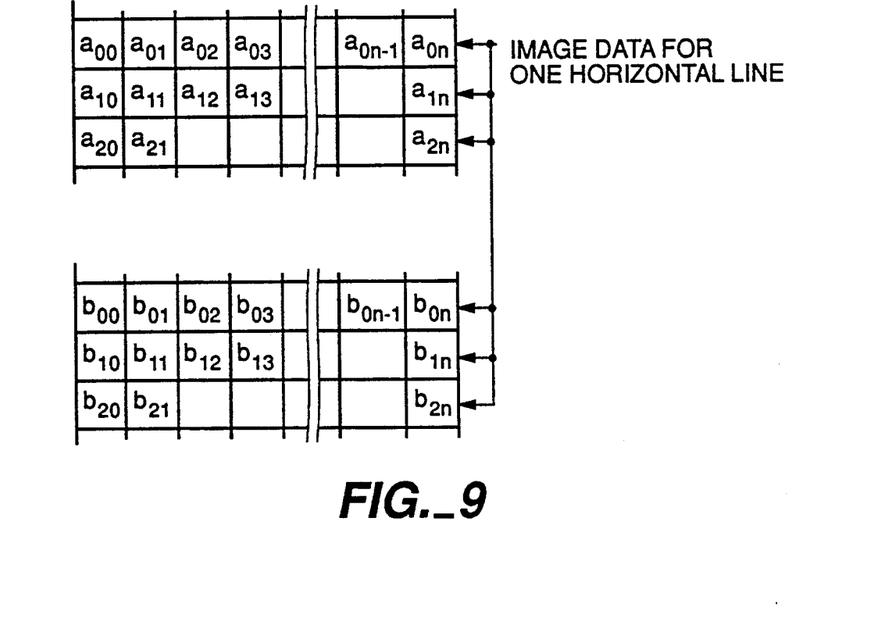
FIG. 9 shows distribution of data in the image memories of FIG. 1, FIGS. 10 and 11 are further examples of source images and superposingly synthesized image obtained therefrom.

Moreover, the procedures according to the present invention are not limited to alternate displaying of two source images in horizontal directions. As shown below by way of examples, similar superposing effects can be obtained by alternately displaying two source images not only horizontally but also vertically. FIG. 8 shows the same two original source images 21 and 22 to be superposed differently to produce another synthesized image 48 by an image synthesizer structured as shown in FIG. 1, details of a circled portion of the synthesized image 48 being also shown. FIG. 9 shows image data for the source images 21 and 22 arranged in the image memories 11 and 12. In each, a horizontal row represents image data for one horizontal scan line. If there are (n+1) pixels in the horizontal direction on the screen of the display device, image data on a horizontal line may, for example, be $a00, a01, a02,... a0n$ in the image memory 21 and $b00, b01, b02,... b0n$ in the other image memory 22. Those on the lines immediately therebelow are $a10, a11, a12,... a1n$ and $b10, b11, b12,... b1n$. To superpose the two source images 21 and 22 as shown in FIG. 8, the address generator 15 generates the addresses of the image memories 11 and 12 alternately for each horizontal scan line. When the image data are stored as shown in FIGS. 9A and 9B, the address generator 15 generates, for example, the addresses of the image data $a00, a01, a02,... a0n$ sequentially during a certain horizontal scan period and those of $b10, b11, b12,... b1n$ during the next horizontal scan period. Thereafter, the addresses of image data from the two image memories and 12 are alternately generated. The image data corresponding to these addresses inputted through the address bus 16 are outputted from the image memories 11 and 12 to the data bus 14 and the display device 13 displays on its screen as shown in FIG. 8 the data inputted through the data bus 14.

Figure 10:
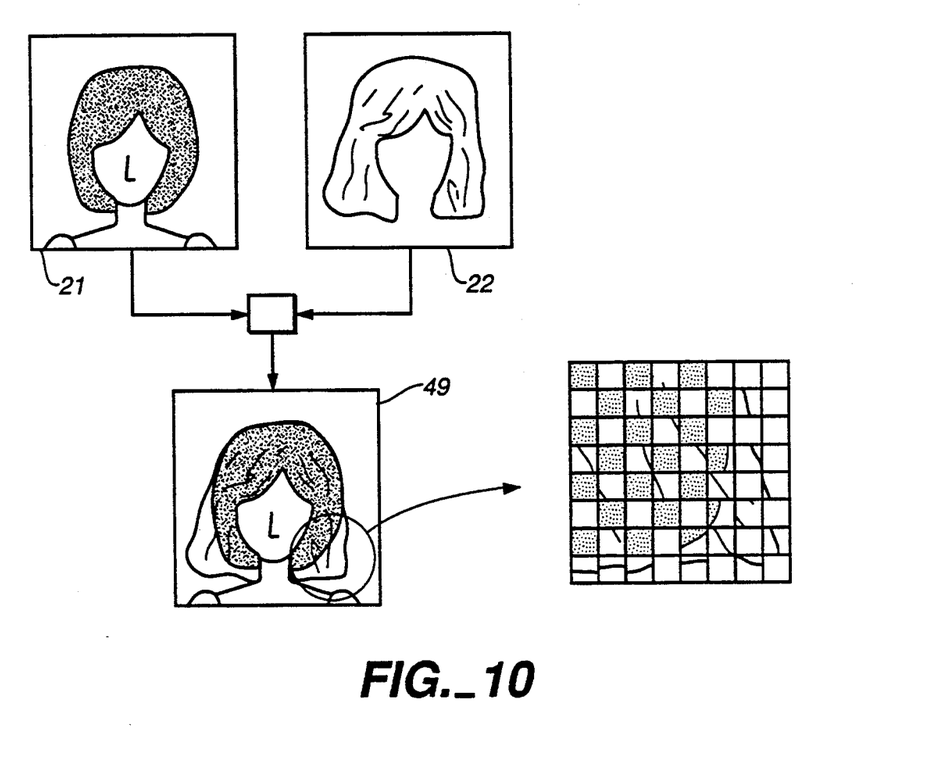

FIG. 10 shows another example of obtaining a synthesized mutually transparent image 49 by superposing the two source images 21 and 22 of which the image data are stored as shown in FIG. 9. The address generator generates addresses of the image memories 11 and 12 alternately for the pixels during each horizontal scan period but by starting with an address from a different image memory each time. In other words, if the address generator 15 sequentially generates the addresses of the image data $a00, b01, a02, b03,... b0n$ during one horizontal scan period, the addresses to be generated sequentially during the next horizontal scan period are those of the image data $b10, a11, b12,... a1n$. Addresses being thus generated during each subsequent horizontal scan period, a synthesized image 49 superposed in a checkerboard fashion can be obtained as explained above in connection with FIGS. 8 and 9. The superposed image 49 looks much like the one shown in FIG. 2A at 23 and FIG. 8 at 48.

Figure 11:
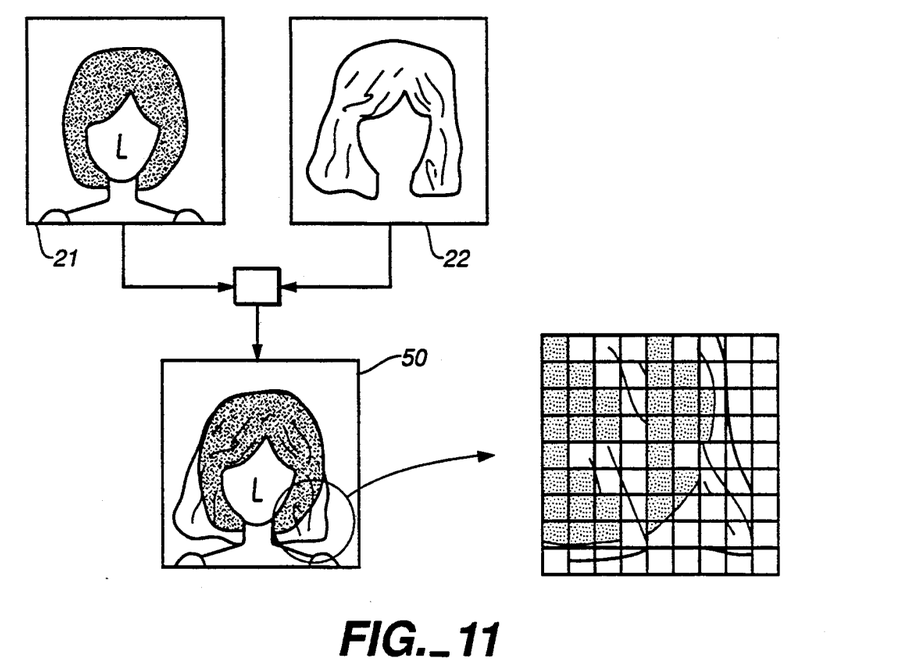
Figure 12:
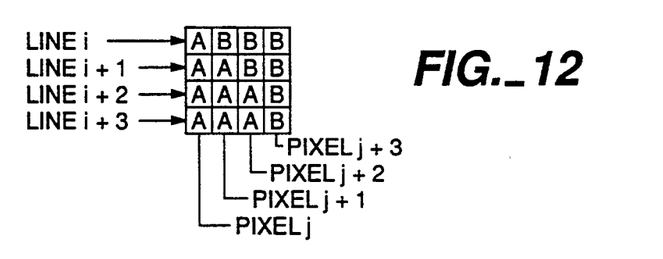
FIG. 12 shows an address pattern in connection with the example shown in FIG. 11.

FIG. 11 shows still another example of obtaining a synthesized mutually transparent image 50 by superposing the two source images 21 and 22 of which the image data are stored as shown in FIG. 9. FIG. 12 shows an example of a pattern of addresses to be generated by the address generator 15 for the purpose of this desired synthesis. When the pixels are arranged in a matrix formation with horizontal rows and vertical columns, as in the previous example shown in FIG. 9, FIG. 12 shows an address of which image memory 21 or 22 should be generated for each pixel on each line, A and B respectively indicating an address of the image memories 11 and 12. In FIG. 12, i and j are dummy integers. This address pattern is stored within the address generator 15.

More in detail, after an address pattern is determined as shown in FIG. 12, the address generator 15 generates addresses of image data of desired pixels on desired lines sequentially by making reference to this address pattern. During a horizontal scan period for a (4i)th line, for example, the address generator 15 sequentially generates the addresses of the image data $a00, b01, b02, b03, a04, b05, b06,...$ and during the next horizontal scan period, those of the image data $a10, a11, b12, b13, a14, a15, b16, b17,...$ are sequentially generated. Thereafter, addresses are sequentially generated for each horizontal scan similarly with reference to this address pattern. As explained above, the image memories and 12 thereupon receive address signal indicative of these generated sequence of addresses through the address bus 16 and transmit corresponding image data through the data bus 14. The display made accordingly on the display device 13 is shown in FIG. 11 at 50.

The present invention has been described above only by way of image synthesizers for superposing two source images one on top of the other such that they are mutually transparent and the user can adjust their positional relationships, but these applications are not intended to limit the scope of the present invention. In what follows, image synthesizers embodying the present invention for image editing apparatus with different capabilities are described.

Figure 13:
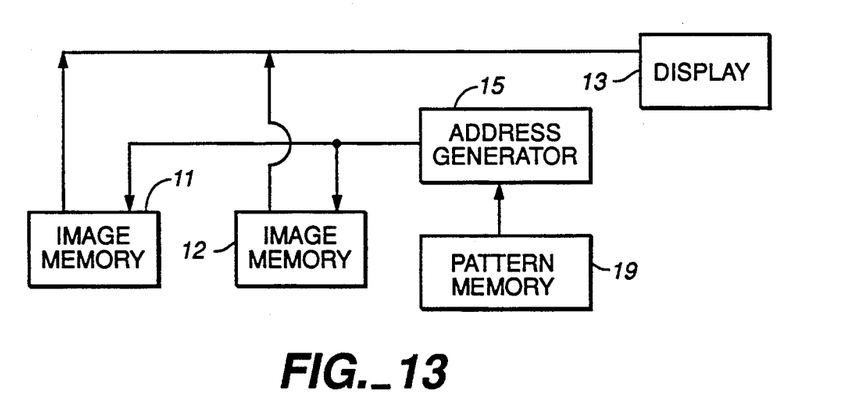
FIG. 13 is a block diagram of still another image synthesizer embodying the present invention.

FIG. 13 shows the structure of an image synthesizer 30 according to still another embodiment of the present invention. Components which have been explained above with reference to FIG. 1 are assigned the same numerals as before and not explained again. In FIG. 13, numeral 19 indicates a pattern memory for storing mask patterns to be described in detail below. The pattern memory 19 is comprised of a semiconductor memory device and peripheral circuit as do the image memories 11 and 12, and is connected to the address generator 15 through an address control bus.

Figure 14:
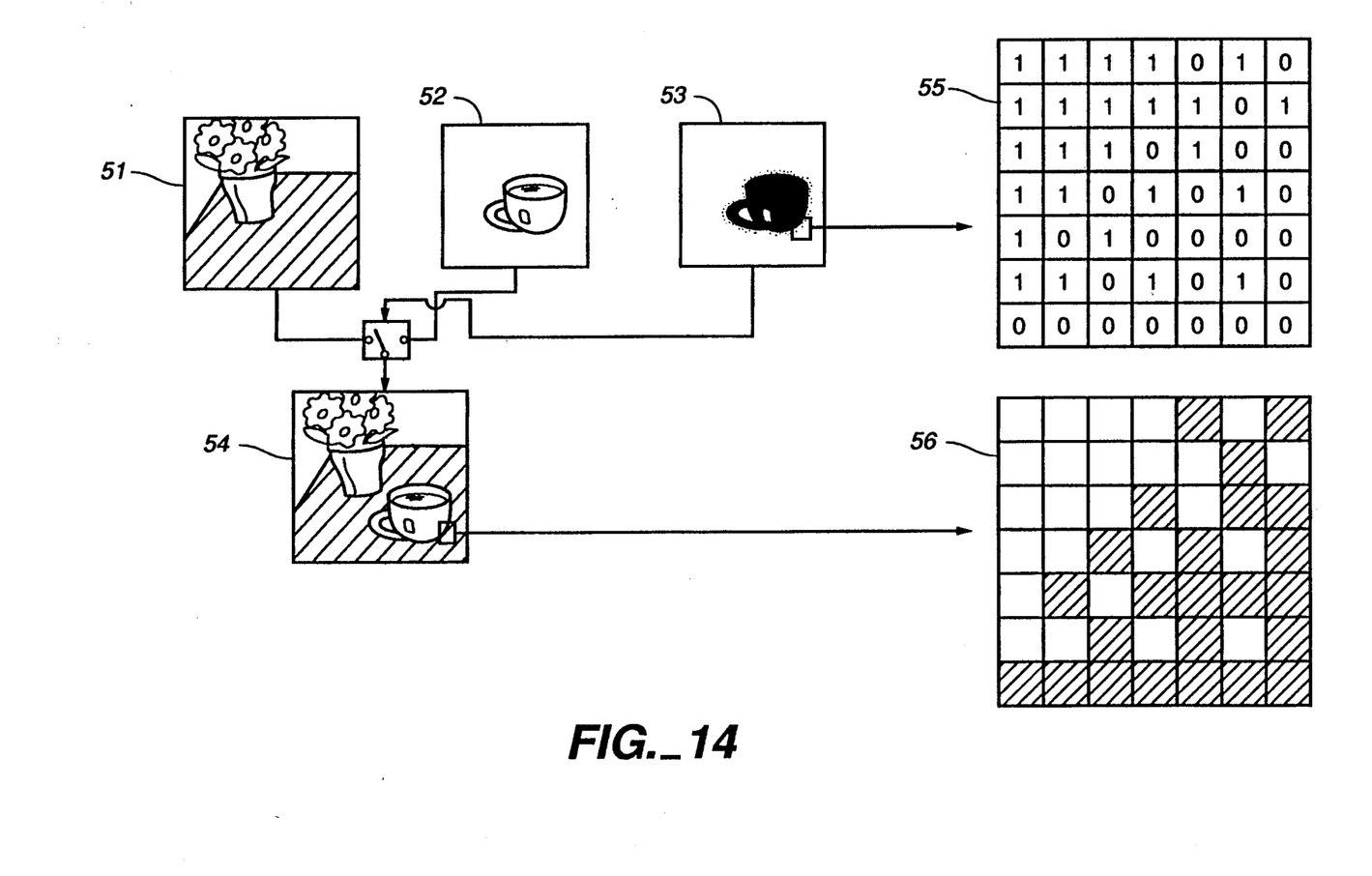
FIG. 14 is another example of source images and a superposingly synthesized image obtained therefrom by the image synthesizer of FIG. 13, FIGS. 15A, 15B and 15C are drawings showing arrangements of data in the memories of FIG. 13.

Let us assume that an original source image 51 with a vase on a table as shown in FIG. 14 is available and that it is desired to combine it with another original source image 52 of a cup such that a synthesized image 54 of both the vase and the cup on the table becomes available. A mask pattern as shown at 53 is used in this application with "1" indicating the area in which the source images 51 and 52 are to be superposed, and is stored in the aforementioned pattern memory 19. Data "0" are written at pixel positions where superposition is not to take place. In FIG. 14, numeral 55 indicates a portion of the mask pattern shown enlarged and numeral 56 likewise indicates a corresponding portion of the synthesized image 54 also shown enlarged.

Figure 15A:
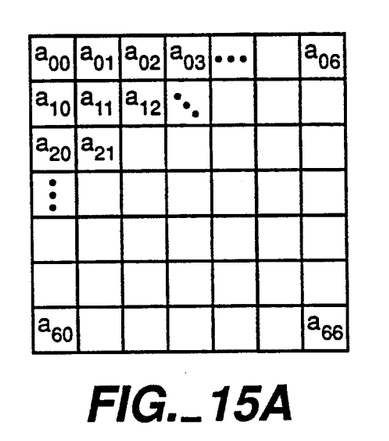
Figure 15B:
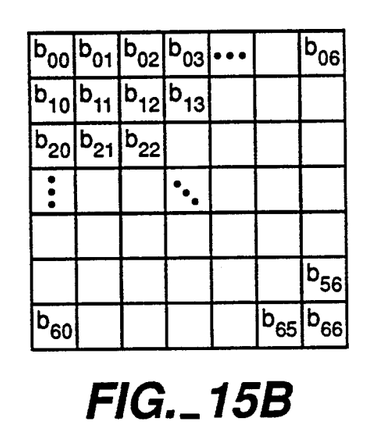
Figure 15C:
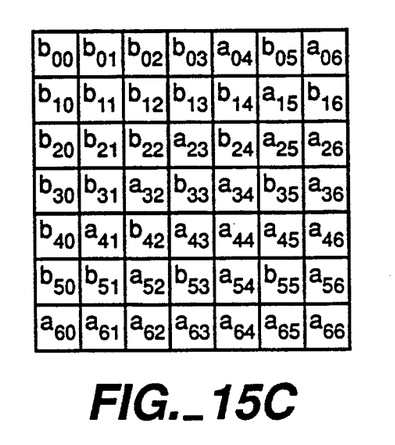

Let us assume, as done above with reference to FIG. 9, that the image data for the portions of the source images 51 and 52 in areas corresponding to the enlarged areas 55 or 56 are arranged as shown in FIGS. 15A and 15B. In other words, FIGS. 15A and 15B are portions of image data arrangement stored respectively in the image memories 11 and 12. FIG. 15C shows the arrangement of these image data inside this enlarged area 55 or 56 when those of FIGS. 15A and 15B are superposed according to, or by using, the mask pattern partly shown in FIG. 14 at 55 and 56.

Next, a procedure is explained in detail whereby the synthesized image 54 is produced by using image data for the source images 51 and 52 stored respectively in the image memories 11 and 12 as well as the mask pattern 53 partly shown at 55 and 56 of FIG. 14 and stored as data in the pattern memory 19. Regarding the mask pattern, since it is used to smooth out the boundary between superposed and non-superposed areas, the densities of "1" and "0" per unit area should be varied gradually from the superposed area to the nonsuperposed area. For example, the mask pattern 53 (and 55) of FIG. 14 shows that the addresses corresponding to the center part of the cup are assigned "1", those corresponding areas not occupied by the cup are assigned "0", and the frequency of occurrence decreases gradually from the center to the outside of the cup area.

To start, the address generator 15 makes reference through the address control bus to the pattern memory 19 regarding each pixel to determined whether to access an address of the image memory 11 or 12, depending on whether the mask pattern 53 on the pattern memory 19 corresponding to the pixel is "0" or "1". If, for example, the image data arrangements regarding a certain area are as shown in FIGS. 15A and 15B and the mask pattern is as shown in FIG. 14, the address generator 15 sequentially generates and outputs address signals corresponding to the image data $b00$, $b01$, $b02$, $b03$, $a04$, $b05$, $a06$,... as shown in FIG. 15C. Upon receiving address signals thus generated, the image memories 11 and 12 output the corresponding image data to the data bus 14 and the display device 13 makes a display based on these outputted image data. The synthesized image 54 thus obtained has less sharp boundaries because the superposed image 52 and the background image 51 because of the use of the mask pattern 53.

Figure 16:
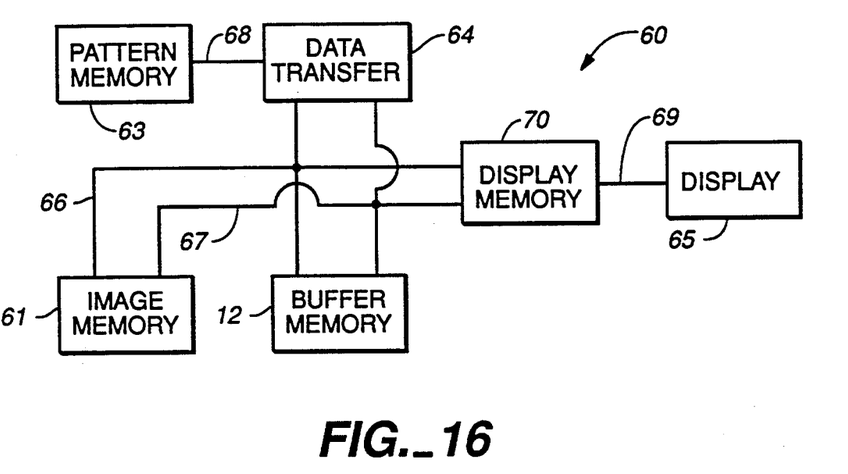
FIG. 16 is a block diagram of still another image synthesizer embodying the present invention.

FIG. 16 shows another image synthesizer 60 embodying the present invention which, like the image synthesizer shown in and explained by way of FIG. 2 above, is characterized as being provided with a display memory 70. This display memory 70, too, is comprised of a semiconductor memory device and peripheral devices and serves to store image data which are transferred through a display bus 69 to be displayed on a display device 65. An image memory 61, a data transfer device 64 including an address generator and a buffer memory 62 are also provided as shown in FIG. 2. Additionally, a pattern memory 63, as explained above in connection with FIG. 13, is connected to the data transfer device 64 through an address control bus 68.

Let us assume that the image data of the source images 51 and 52 shown in FIG. 14 are respectively stored in the display memory 70 and the image memory 61 in the matrix formations shown in FIGS. 15A and 15B, and that data of the mask pattern 55 are stored in the pattern memory 63. Let us further assume that it is desired to use this image synthesizer 60 to display a synthesized image 54 with boundary lines properly made smooth and then returned to the original condition. In this case, the data transfer device 64 makes reference through the address control bus 68 to the pattern memory 63 and, if the mask pattern 55 shows "1" regarding certain pixels, the image data stored in the image memory 61 at the corresponding addresses are caused to be sequentially transferred to their corresponding addresses in the display memory 70. At the same time, those image data in the display memory 70 at these corresponding addresses, which are therefore to be replaced by the data transferred from the image memory 61, are transferred to, and saved in, the buffer memory 42 as explained above by way of FIG. 5. The image data of the image memory 41 at addresses where the mask pattern 55 shows "0" are not transferred to the display memory 70.

Let us now consider that the first rows in FIGS. 15A and 15B correspond to a same horizontal scan line which also corresponds to the first row of the mask pattern 55 shown in FIG. 14. For this horizontal line scan, since the pattern data are (1, 1, 1, 1, 0, 1, 0), only the five image data $b00$, $b01$, $b02$, $b03$, $b05$ corresponding to the data "1" are transferred to the corresponding addresses of the image memory 70 containing $a00$, $a01$, $a02$, $a03$, $a05$. At the same time, these image data $a00$, $a01$, $a02$, $a03$, $a05$ to be overwritten are transferred to the buffer memory 62 and stored therein. The addresses of the image memory 70 corresponding to this horizontal scan line now contain the image data $b00$, $b01$, $b02$, $b03$, $a04$, $b05$, $a06$. Thereafter, the display device 65 reads the contents of the image memory 70 as explained above in connection with FIG. 4 and a synthesized image as shown in FIG. 14 is displayed. To return from this display of the synthesized image to the original display of one of the source images (51 of FIG. 14), the image data temporarily saved in the buffer memory 42 are sequentially returned to their addresses in the display memory 70 according to the positions of data "1" on the mask pattern.

Figure 17:
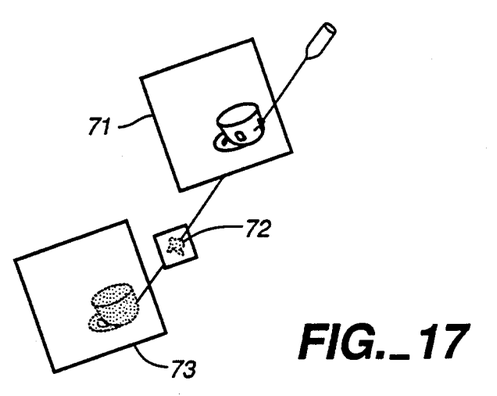
FIG. 17 is a drawing for explaining a method of preparing a mask pattern.
Figure 18A:
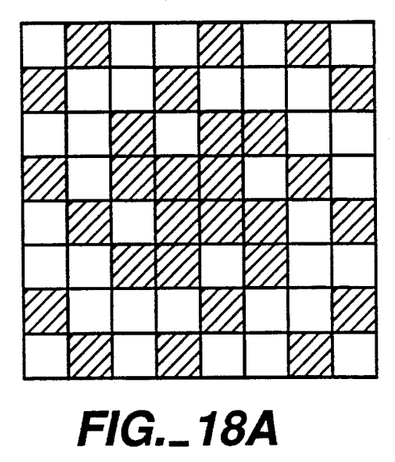
FIGS. 18A–18D are examples of brush patterns for preparing a mask pattern.
Figure 18B:
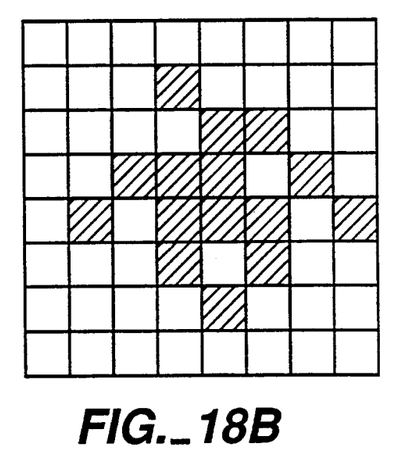
Figure 18C:
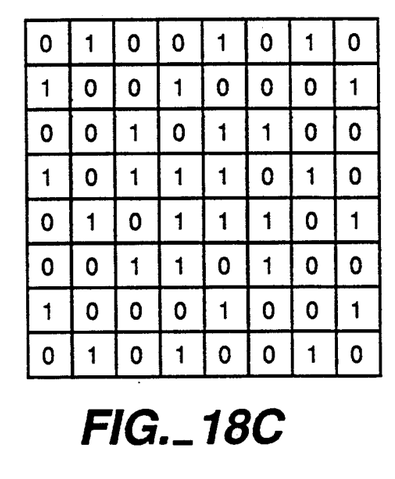
Figure 18D:
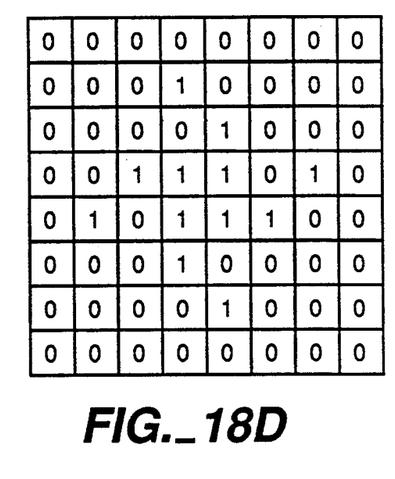
Figure 19:
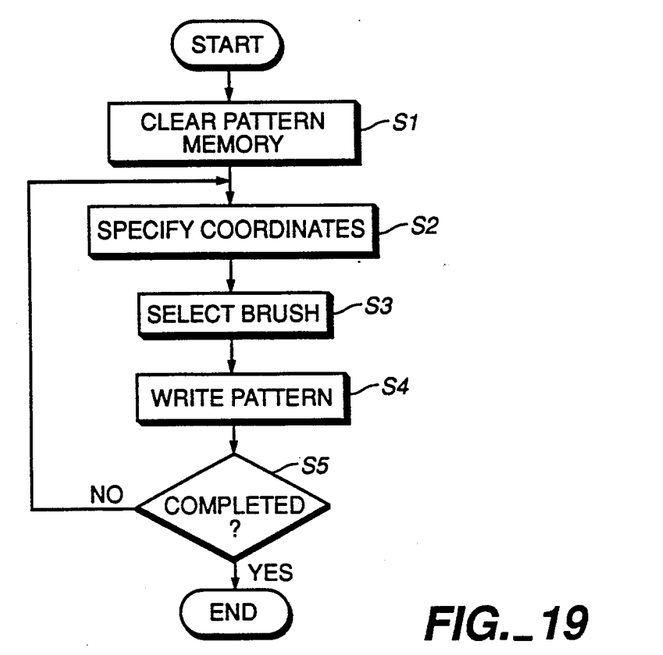
FIG. 19 is a flow chart of a process for preparing a mask pattern.

Next, several methods of preparing a mask pattern are described. As shown in FIG. 17, a brush pattern 72 is prepared in a known manner from an original image 71 which is the subject of masking so as to produce a desired mask pattern 73. FIGS. 18A and 18B are two examples of brush patterns intended to have a black area at the center which gradually becomes white in the edge areas. FIG. 18A is a pattern with a larger central black area than the pattern shown in FIG. 18B. FIGS. 18C and 18D are corresponding patterns with black areas represented by "1" and white areas by "0". To prepare a mask pattern in a pattern memory (such as shown in FIG. 13 at 19 and in FIG. 16 at 63), the memory contents are cleared (S1 in FIG. 19), to start with. This may be accomplished, for example, by writing "0" at all addresses. Next, the user specifies a coordinate system with respect to the original image 71 of interest by means of a pointing device such as a mouse (S2).

Next, one of available brush patterns such as shown in FIGS. 18A–18D is selected with reference to the defined coordinate system (S3). If different brush patterns are used, depending on the defined coordinate system, affinity of the synthesized image to its surroundings (that is, the degree of inconspicuousness) can be varied. In the case of the image 52 of a coffee cup, for example, the brush pattern of FIG. 15C may be used near the bottom of the cup because it is less important to see its boundary line with the table top but that of FIG. 15D may be preferred near the top around its rim to show clearer boundary lines.

Next, the center point of the selected brush pattern is positioned at the address of the pattern memory 19 or 63 corresponding to the specified coordinate system and the logical sums are obtained between the data already stored in the pattern memory 19 or 63 and the data on the selected brush pattern (S4). The sums thus obtained are stored in the pattern memory 19 or 63. This process is repeated until all relevant areas of the image 71 have been covered (YES in S5). The mask pattern thus completed may appear as shown in FIG. 14.

Figure 20:
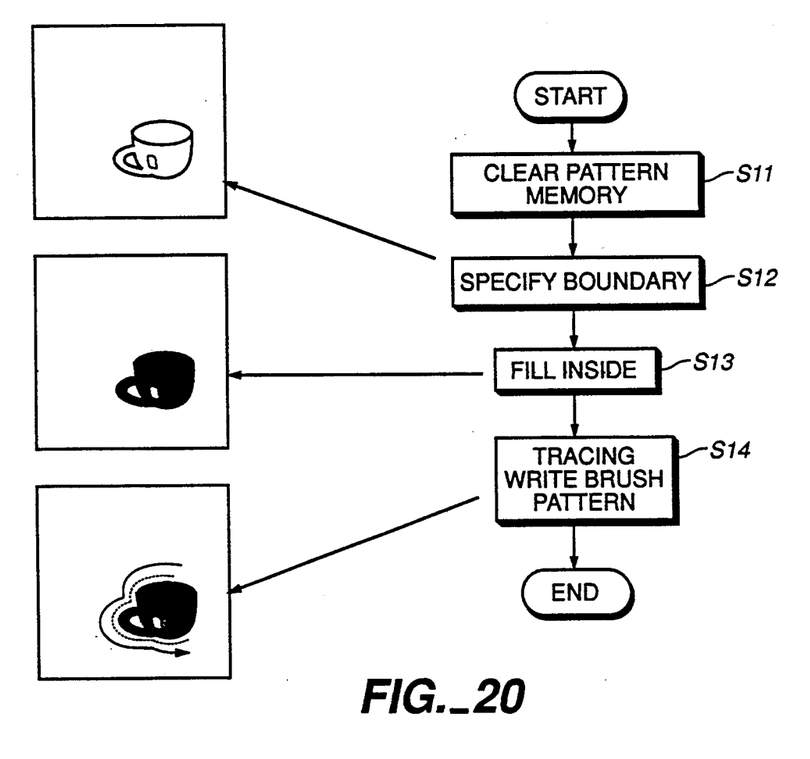
FIG. 20 is a flow chart of another process for preparing a mask pattern.

FIG. 20 shows another method of preparing a mask pattern. According to this method, after the contents of the pattern memory are cleared (S11) as explained above, a curve is specified to mark the boundary of the image (such as that of a coffee cup) to be superposed (S12). Thereafter, data "1" are written at addresses corresponding to this boundary curve. Next, all data of the pattern memory inside this boundary curve are replaced by "1" (S13). Finally, the center of a selected brush pattern is positioned at the coordinate of a point on the boundary between data "1" and "0" and, while the boundary is traced along pixels, logical sums of the data already stored in the pattern memory and the brush pattern data are calculated, the results being written in the pattern memory (S14).

Figure 21:
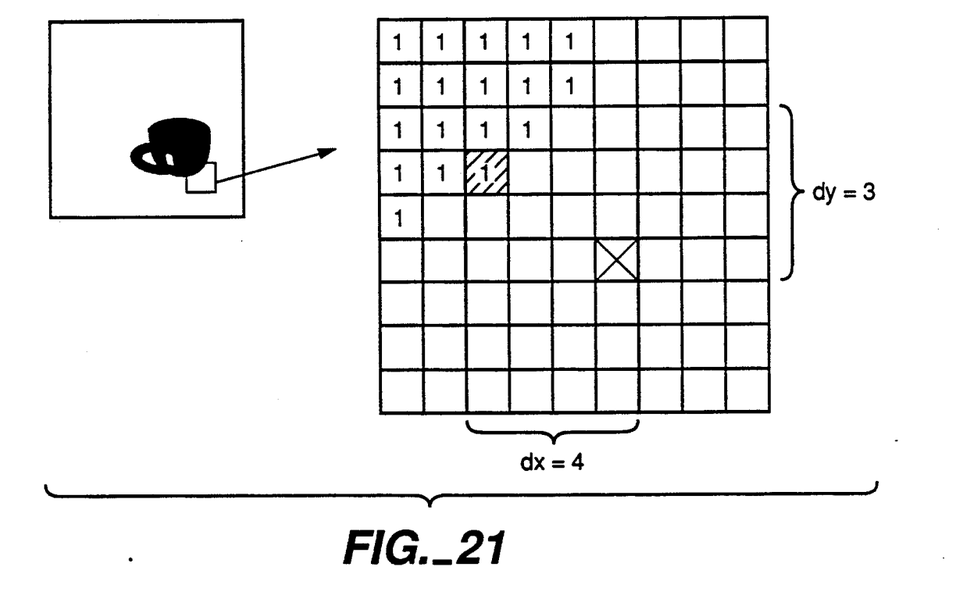
FIGS. 21 and 22 are a drawing of a portion of pattern memory and a flow chart for explaining still another process for preparing a mask pattern.
Figure 22:
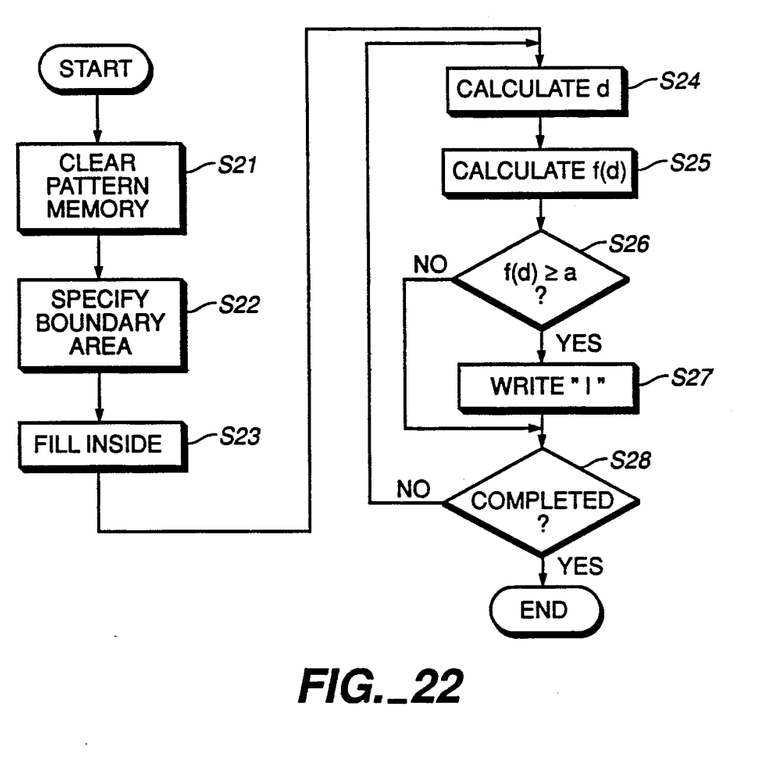

A still another method of preparing a mask pattern is explained next by way of FIGS. 21 and 22. FIG. 21 shows contents of a pattern memory and an enlarged view of a portion thereof. First, as done in the previous example, the memory contents are cleared (S21), data on the boundary curve are replaced by "1" (S22) and those inside the curve are replaced by "1" (S23). Next, a pixel where "1" is not written is picked for consideration and its distance d to the aforementioned boundary curve is calculated (S24). If the pixel under consideration is denoted by X as shown in FIG. 21, the distance d is defined by the formula $d = (dx)^2 + (dy)^2$ where dx and dy are the minimum numbers of pixels in the horizontal and vertical directions between the pixel X and the boundary curve. In the example shown in FIG. 21, $dx = 4$, $dy = 3$ and hence $d = 25$.

A function f(x) of a dummy variable x is assumed to have been preselected for the purpose of determining whether "1" should be written or not at a pixel separated from the boundary by distance x, and the value f(d) is obtained by using this function (S25). The function f(x) may be so selected that "1" should be written if f(x) is greater than a certain threshold value a. As an example, f(x) may be defined by $f(x) = 50 - d + rnd(49)$ where rnd(n) indicates a random number between 0 and n, and $a = 50$. If f(d) is greater than or equal to the threshold value (YES in S26), "1" is written at this pixel (S27). If f(d) is less than the threshold value (NO in S26), "0" is allowed to stay at this pixel. This entire process is repeated for all pixels where "1" was not written in the beginning (S28).

The present invention further teaches a preprocessing method in order to make the boundary between two mutually superimposed source images even less conspicuous. Let us consider a situation, with the example of the image 52 of a coffee cup, wherein there are pixels corresponding to data "1" in the mask pattern 55 outside the area of the cup and, furthermore, wherein their density is not similar to that in the boundary area inside the cup. In such a situation, pixels outside the cup before the synthesis still remain outside the cup after the synthesis.

Figure 23A:
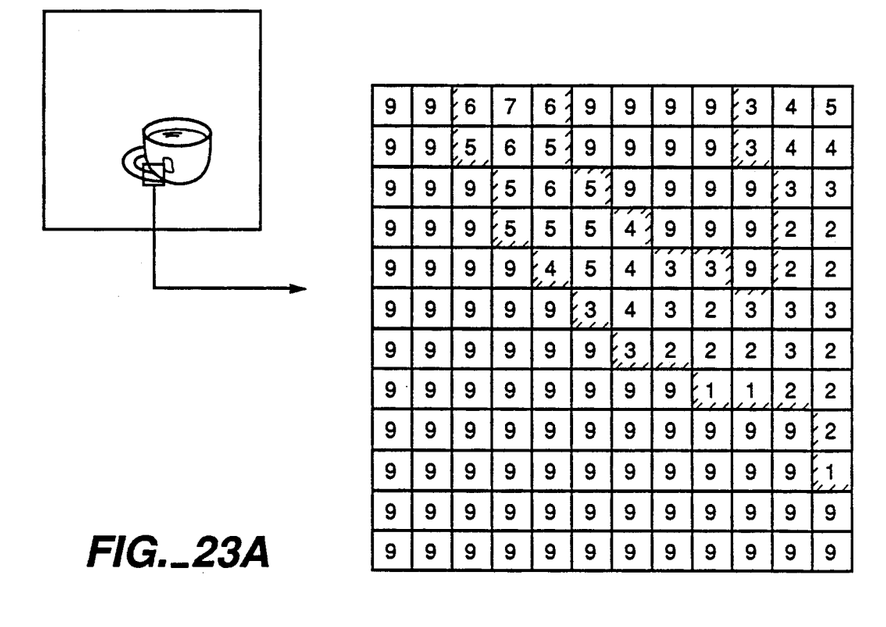
FIGS. 23A and 23B are drawings for showing a preprocessing procedure embodying the present invention.

By way of illustration, let us consider a portion of the image of 52 of the cup, and assume that the image data for this portion are as shown in FIG. 23A wherein the numerals inside squares indicate the pixel values (densities) at the corresponding positions. Stated briefly, this preprocessing method is to synthesize two source images after rewriting the pixel values of extended peripheral areas of the boundary by the pixel value of the cup itself and its environs.

Figure 23B:
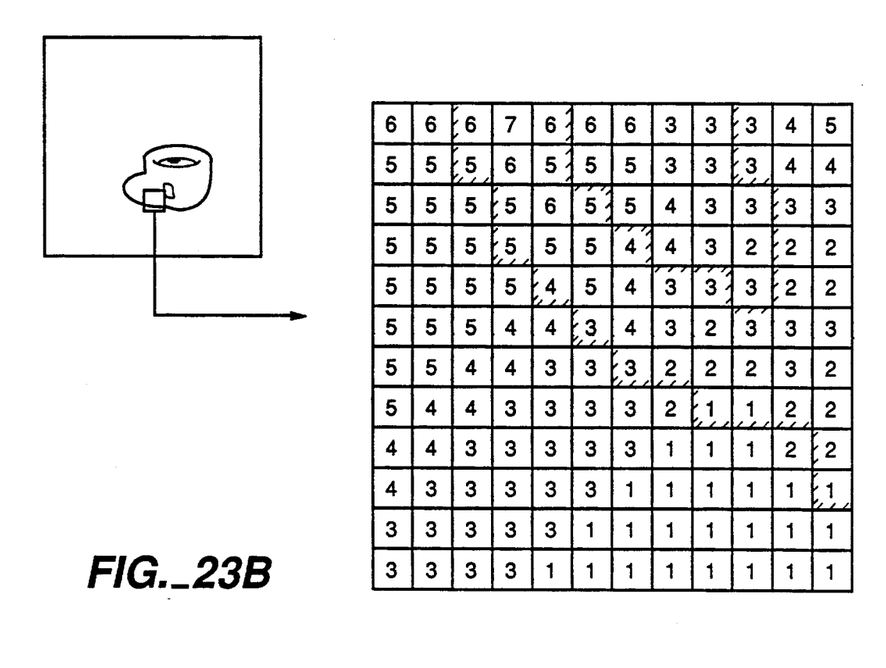

With reference to FIG. 23A, it is immediately noticed that pixel values of areas other than those of the cup are "9". According to the preprocessing method of the present invention, the pixel value of any pixel outside the area of the cup and corresponding pixel value of "9" is replaced by that of the pixel which is closest to it among the pixels inside the area of the cup. If such preprocessing is carried out regarding every pixel which is outside the area of the cup but of which the distance from the boundary area is within the size of the brush pattern being used, the result is as shown in FIG. 23B. With a preprocessing thus effected, pixel values become same at the boundary both inside and outside the area of the cup. Thus, if pixels outside the cup area remain after the synthesis, they are made less conspicuous.

The foregoing description of preferred embodiments of the invention has been presented for purposes of illustration and description. It is not intended to be exhaustive or to limit the invention to the precise form disclosed, and many modifications and variations are possible in light of the above teaching. Such modifications and variations that may be apparent to a person skilled in the art are intended to be included within the scope of this invention.

What is claimed is:

1. An image synthesizer comprising
   memory means storing image data of a plurality of source image,
   display means with pixels for displaying an image according to received image data,
   a pattern memory for storing, when two or more source images are synthesized for a composite image display with boundary areas therebetween, a pattern according to which those of said pixels displaying one of said synthesized source images are scattered at a varying rate inside another of said synthesized source images within said boundary areas, said boundary areas containing a boundary line and said pattern being such that the density of said scattered pixels varying gradually from said boundary line in said boundary areas, and data processing means for effecting said composite image display on said display means according to said pattern such that parts of said one of said synthesized source images are scattered within said another synthesized source image within said boundary areas, thereby causing said boundary areas to become controllably less conspicuous.

* * * * *